(12) United States Patent
Goodman

(10) Patent No.: US 6,815,930 B2
(45) Date of Patent: Nov. 9, 2004

(54) PROTECTION CIRCUIT FOR A BATTERY CELL

(75) Inventor: George D. Goodman, Phoenixville, PA (US)

(73) Assignee: Alliburton Energy Services, Inc., Houston, TX (US)

(*) Notice: Subject to any disclaimer, the term of this patent is extended or adjusted under 35 U.S.C. 154(b) by 158 days.

(21) Appl. No.: 10/056,144

(22) Filed: Jan. 24, 2002

(65) Prior Publication Data

US 2003/0137280 A1 Jul. 24, 2003

(51) Int. Cl.[7] .............................................. H01M 10/44
(52) U.S. Cl. ...................................... 320/134; 320/136
(58) Field of Search ................................ 320/122, 119, 320/134, 136; 307/130, 125

(56) References Cited

U.S. PATENT DOCUMENTS

| | | | |
|---|---|---|---|
| 3,221,239 A | 11/1965 | Langer et al. ................. 320/17 |
| 3,348,117 A | 10/1967 | Howden ....................... 320/18 |
| 3,646,422 A | * 2/1972 | Hankley ...................... 320/126 |
| 4,061,955 A | 12/1977 | Thomas et al. ................ 320/6 |
| 4,303,877 A | 12/1981 | Meinhold ..................... 320/6 |
| 4,616,170 A | 10/1986 | Urstöger ...................... 320/5 |
| 5,142,215 A | * 8/1992 | Mathison ..................... 320/141 |
| 5,179,337 A | 1/1993 | Staarman et al. ............. 320/13 |
| 5,459,357 A | * 10/1995 | Minks ........................ 307/10.7 |
| 5,539,299 A | * 7/1996 | Fernandez et al. ........... 320/163 |
| 5,600,231 A | * 2/1997 | Parker ........................ 429/93 |
| 5,635,821 A | * 6/1997 | Smith ......................... 320/103 |
| 5,703,471 A | * 12/1997 | Bullock et al. .............. 320/134 |
| 5,744,936 A | 4/1998 | Kawakami ................... 320/120 |
| 5,754,384 A | * 5/1998 | Ashley ....................... 361/93.9 |
| 5,789,900 A | * 8/1998 | Hasegawa et al. .......... 320/132 |
| 5,894,212 A | 4/1999 | Balogh ....................... 320/122 |
| 5,898,239 A | * 4/1999 | Kawam ....................... 307/130 |
| 5,909,103 A | 6/1999 | Williams ..................... 320/134 |
| 5,982,145 A | 11/1999 | Eguchi ........................ 320/128 |
| 5,998,967 A | 12/1999 | Umeki et al. ............... 320/122 |
| 6,043,628 A | 3/2000 | Perelle et al. ............... 320/119 |
| 6,046,514 A | 4/2000 | Rouillard et al. ............. 307/77 |
| 6,222,346 B1 | * 4/2001 | Mori .......................... 320/134 |
| 6,246,214 B1 | * 6/2001 | Oglesbee .................... 320/136 |
| 6,294,766 B1 | * 9/2001 | Autry et al. ................. 219/507 |
| 6,518,731 B2 | * 2/2003 | Thomas et al. ............. 320/136 |

* cited by examiner

Primary Examiner—Bao Q. Vu
(74) Attorney, Agent, or Firm—Conley Rose, P.C.

(57) ABSTRACT

A protection circuit couples to and protects a battery cell. The protection circuit generally limits the current that can flow through cell when the voltage across the cell falls to a predetermined minimum threshold, such as might occur if the cell is passivated, fails in service, or is reaching the end of its useful life. The protection circuit preferably includes a transistor, which couples in series with the cell and limits the current therethrough. By limiting the current through the cell when its voltage reaches a minimum threshold, the voltage on the cell will not fall below the minimum safe level. A bypass means (e.g., a diode) also is included to conduct current around the cell when its current has been limited by the transistor.

38 Claims, 2 Drawing Sheets

PROTECTION CIRCUIT FOR A BATTERY CELL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to protecting battery cells from various fault conditions and unequal cell performance during normal operation. More particularly, the invention relates to a cell protection circuit that provides over-current protection to battery cells.

2. Background Information

Batteries are useful for a variety of purposes, but generally must be operated in accordance with various criteria to ensure the safety and reliability of the battery and the device for which it provides power. The protection circuit described herein has been developed for use in connection with lithium batteries that are used in downhole tools. Such tools may be used for open hole logging and/or drilling purposes. Although the following background information and description of the protection circuit may be presented in the context of protecting high voltage, lithium battery packs, the protection circuit is useful for batteries used in a variety of other applications and for non-lithium battery types, particularly those that have similar safety and reliability concerns. Accordingly, the disclosure and claims which follow are not limited to the context in which the protection circuit is discussed below.

By way of definition, a "cell" is an individual location where chemical energy is converted into electric energy. A "battery" or "battery pack" is a collection of one or more cells connected in series or in parallel to produce more current, voltage or power than is provided by an individual cell.

The selection of battery type and configuration for downhole tools is influenced by various considerations. Downhole tools are typically packaged so as to have a diameter less than four inches so as to fit within a standard 8¼ inch diameter drill pipe. For obvious reasons, space is therefore at a premium for a downhole tool and thus battery packs should be as small as possible. Further, downhole tools usually experience relatively high temperatures presenting a potential hazard for the tool and its battery. It is not uncommon, for example, for the tool to operate at temperatures exceeding 150° C. or even 175° C. Also, the relatively high cost (labor and materials) of a seismic or drilling operation makes it desirable to reduce cost whenever possible. In light of these considerations, lithium cell chemistry is used in a majority of downhole tool applications today when surface power is not provided by a wireline or other means. Lithium cells, and particularly, lithium thionyl chloride ($Li/SOCl_2$) cells provide high energy densities (i.e., a relatively large amount of energy given the size and weight of the cell when compared to other types of cells) and excellent high temperature performance. Thus, relative to many other types of cells, lithium cells last longer and operate better at higher temperatures with lower total cost.

Despite the advantages of lithium cells, they are not problem free. For instance, the discharge profile of a lithium cell must be carefully controlled to obtain the available energy from the cell and prevent hazardous conditions. Two of the most prevalent conditions that interfere with optimal $Li/SOCl_2$ cell performance are excessive anode "passivation" and cathode "freeze-over." Anode passivation refers to the formation of a layer of lithium chloride (LiCl), which is also known as solid electrolyte interphase (SEI), on the anode surface. Cathode freeze-over refers to the formation of LiCl discharge products in the outer portion of the cathode which blocks access to unused reaction sites.

A thin SEI layer is always present on the surface of the anode. This layer is formed as a result of the reaction between the lithium and the thionyl chloride electrolyte in the cell, and the layer begins to form as soon as a cell is filled with electrolyte. The LiCl generally is a desirable feature for long term storage of such cells because it helps to minimize or prevent self-discharge. It is only when the cell is placed into service that passivation becomes a problem. Anode passivation is responsible for the condition known as "voltage delay," which is the initial drop in potential observed when a load is first placed on a cell. The voltage drop is caused by the SEI layer which acts as a series resistor. As current flows through the cell, the SEI layer begins to evaporate resulting in an associated increase in cell terminal voltage. This process is called "depassivation." In a freshly manufactured cell, the drop in running potential may last for less than a second, but in a heavily passivated cell (i.e., a cell with thick SEI layer), the voltage may drop below its nominal voltage (e.g., 3 volts) for an extended period of time.

As noted above, the performance of $Li/SOCl_2$ cells also can be detrimentally affected by cathode freeze-over which is the formation of LiCl discharge products in the outer portion of the cathode to the extent that it blocks the electrolyte's access to unused reaction sites. The discharge of $Li/SOCl_2$ cells results in the formation of LiCl in the cathode. If the cell is discharged at low rates (e.g., a current density of less than 2 milliamps per square centimeter), the LiCl will be evenly distributed throughout the carbon cathode, which results in efficient use of the active sites available for the reduction of $SOCl_2$. At discharge rates greater than 2 $mA/cm^2$, the reduction of $SOCl_2$ occurs predominantly on the outer surfaces of the cathode. The outer surface of the cathode effectively "freezes over" with LiCl, and the inner active surfaces become inaccessible. Unlike passivated anodes, which can be recovered via a depassivation process, cathodes that have been frozen over are irreparably damaged and capacity loss will result.

As noted above, passivated cells can be depassivated. This can be accomplished by placing the cells under load in a predetermined manner. Initially, the cell voltage will drop (below 3 V) due to the passivation, but gradually increase as the cell becomes unpassivated. One suitable way to depassivate a pack of cells is to place the cells under a light current load and then, as the voltage increases due to depassivation, increase the current draw on the pack.

For many cells, the voltage will begin to rise in about 15 minutes. A severely passivated cell may have a cell voltage below 3 V for a prolonged period of time (e.g., more than one hour). Any load that results in a cell voltage below 3 V for a prolonged period of time may cause cathode damage and reduce cell capacity. Batteries used for high voltage downhole tools typically are constructed from dozens or even a hundred or more series-connected lithium cells. Depassivating a pack of 100 cells might successfully depassivate most of the cells in the pack, but some cells may remain depassivated due to variations between individual cells. It is difficult to determine whether a few cells out of a hundred are passivated. Thus, as the current load is increased during the depassivation process, some cells that are still passivated will experience an increasing current demand. Because of the passivation that remains on such cells, the voltage of such cells will drop as the current load is increased. As explained below, this voltage drop can be harmful to the cell.

Cell voltage generally decreases as the current demand on the cell increases. Also, cell voltage will generally decrease as a cell ages and nears the end of its useful life. Most cell manufacturers recommend that their cells not be discharged to a point where the cell voltage is below a minimum level (e.g., 2 V). Forcing a cell below 2 V may cause bulging of the cell due to the build up of gaseous discharge products in the cell. It is also widely known that lithium cells exhibit safety concerns when the cells are discharged into reversal (the cell voltage reverses polarity). Besides cell reversal, the cells can also vent various gasses from a short circuit at elevated temperatures. Manufacturers also warn that excessive loading of 3 or more cells in series has been known to result in venting caused by cell reversal.

Accordingly, because current is increased during the depassivation process and the voltage of passivated cells decreases with increases in current, it is possible to over drive a passivated cell during the depassivation process. This is particularly problematic for large strings of cells in a battery in which it is difficult to detect a few passivated cells out of numerous other depassivated cells in the battery. Over driving a passivated cell in this manner may cause such problems as cell reversal and off gassing. A solution to this problem is needed.

A similar concern is also present during the normal use of a battery. The battery provides the current needed by the device (e.g., downhole tool). If one or more of the cells in the battery are passivated, the cell voltage for such cells may drop to a dangerous level. Also, a cell that is not passivated, but is nearing the end of its useful life, may be unable to provide the necessary current at an acceptable voltage level. As such, the voltage of such a nearly spent cell may be forced to a dangerously low level at the current level demanded by the load.

In summary, there are various reasons why a cell may be forced to an undesirable or dangerously low voltage level. Several of such reasons are given above. Regardless of the reason, a way to guard against such a condition is needed.

BRIEF SUMMARY OF THE PREFERRED EMBODIMENTS OF THE INVENTION

The problems noted above are solved in large part by a protection circuit which couples to and protects a cell. The protection circuit generally limits the current that can flow through the cell when the voltage across the cell falls to a predetermined minimum threshold. By limiting the current through the cell in this situation, the voltage on the cell will not fall below the minimum safe level.

In accordance with one embodiment of the invention, the protection circuit includes a transistor coupled in series with the cell and a bypass device coupled to both the transistor and the cell and in parallel with the transistor and cell. The transistor preferably comprises a metal oxide semiconductor field effect transistor ("MOSFET") and more preferably either an n-channel, enhancement mode MOSFET or a p-channel, enhancement mode MOSFET. The bypass device preferably comprises a diode that permits current to conduct around the cell being protected when the transistor limits the current through the cell.

If desired, a delay element can be included in the protection circuit to slow the change in voltage across the transistor with short duration pulse loading. The delay element may comprise a resistor coupled to a capacitor to provide a desired R-C time constant. The delay element increases the performance of the cell by not activating the current limiting function of the transistor.

In a battery comprising a plurality of cells, each cell can have its own protection circuit, thereby providing improved protection in a multi-cell battery. The protection circuit, in fact, can be made in the form of a disk or wafer that physically is disposed between adjacent cells in a string of serially connected cells. It is also possible to include the protection circuit within each cell. In this way, the cell's voltage can be maintained at a safe level. These and other advantages will become apparent upon reviewing the following disclosure.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
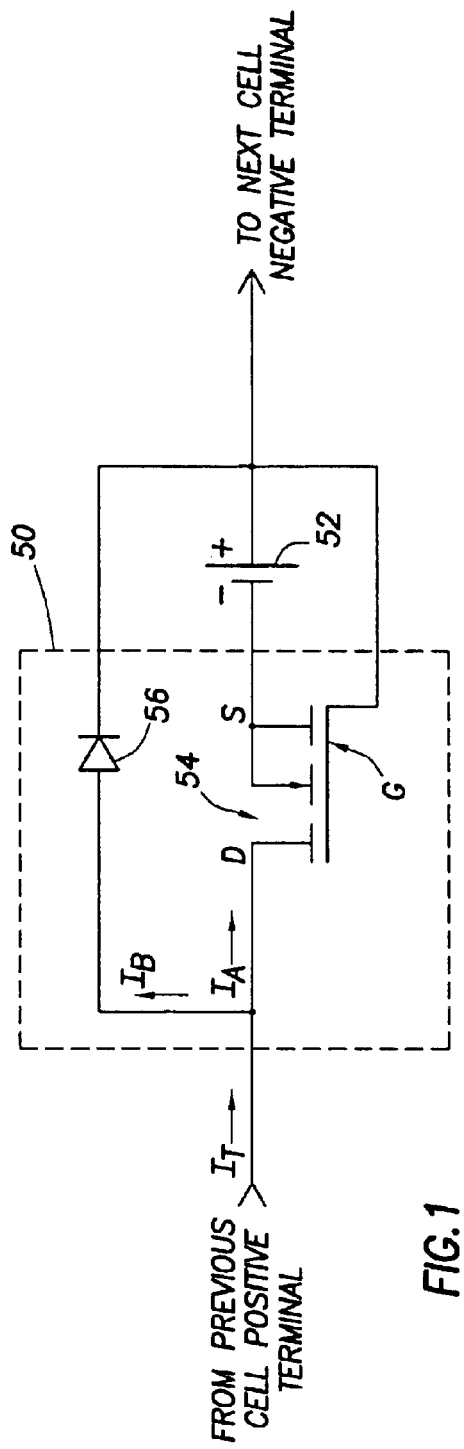
FIG. 1 shows an embodiment of a protection circuit using an N-channel MOSFET transistor for use with a cell.

Referring to FIG. 1, a protection circuit 50, constructed in accordance with a preferred embodiment of the invention, is shown for protecting an individual cell 52. Preferably, each cell in a serially connected string of cells includes its own protection circuit connected as shown in FIG. 1. The form of the protection circuit 50 may vary from that shown; the particular circuit shown in FIG. 1 is only one of numerous possible circuits for implementing the invention.

As shown in FIG. 1, the protection circuit 50 preferably includes at least two parts—a cell voltage-dependent current limiter 54 and a current bypass device 56. Preferably, the current limiter 54 comprises a transistor and the bypass device 56 comprises a diode. In accordance with the preferred embodiment of FIG. 1, the transistor 54 is an n-channel enhancement metal oxide semiconductor field effect transistor (MOSFET). The source (S) of the MOSFET 54 connects to the negative terminal of the cell 52 to be protected. The gate (G) of the MOSFET connects to the positive terminal of the cell 52. The drain (D) connects to the preceding cell (not shown) in a series of cells. The positive terminal of the cell 52 also connects to the cathode of the diode 56 and connects to the subsequent cell (not shown) in the series connection of cells. The anode of the diode 56 connects to the drain D of the MOSFET 54. The protection circuit 50 shown in FIG. 1 provides protection for the cell 52 as will be described below. Preferably, as noted above, each cell in a battery would have its own protection circuit. Thus, a battery with 100 cells would have 100 protection circuits 50. Although, a separate protection circuit preferably is included for each cell in a battery, this is not a requirement in that not every cell in a battery need have a protection circuit 50.

The operation of the protection circuit 50 will now be described with reference to FIG. 1. As shown, the transistor 54 is connected in series with the electrical current path through the cell 52 to be protected. The circuit 50 is designed to restrict current through the cell when the cell voltage falls to a predetermined minimum level, that is deemed the minimum safe operating voltage for the cell. This is accomplished by selecting a MOSFET 54 that has a threshold voltage equal to, approximately equal to or slightly greater than the cell's minimum target voltage. If, for example, the minimum target cell voltage is 2 V, then the MOSFET selected or designed to use as transistor 54 is a MOSFET with a 2V threshold, or a MOSFET with a threshold of approximately 2 V or slightly greater than 2V (e.g., 2.1 V).

Because the cell 52 is connected between the gate and source terminals of the MOSFET 54, during normal operation (i.e., no fault condition) the cell voltage (being greater than the MOSFET's threshold voltage) biases the transistor into its fully on state. The fully on state is the state in which the MOSFET is in its low resistance mode, as would be understood by those of ordinary skill in the art. While in this state, the cell is permitted to source as much current as is demanded by the load (not shown) providing an associated cell voltage. In this normal state, the diode 56 does not conduct current.

If, however, the cell voltage falls to the predetermined minimum level, the state of transistor 54 changes to its linear mode of operation in which the drain voltage varies to maintain a constant gate-to-source voltage. The cell voltage may fall to the minimum target level because the cell is passivated and the internal resistance of the cell caused by the passivation layer causes the cell's terminal voltage to be lower for a given current level than it would have been if it was not passivated. Also, the cell voltage may drop excessively because the cell has simply reached, or is approaching the end of, its useful life and does not have the capacity to provide the necessary current without a larger drop in cell voltage. Regardless of why the cell voltage has fallen to the minimum target level, once at that selected target voltage level (e.g., 2V), the MOSFET 54 changes from being fully on to being in the linear region of its operation. This MOSFET state change is caused by the voltage across the cell being used as the gate voltage for the MOSFET 54. When that cell voltage (and thus gate voltage) reaches the threshold voltage of the transistor, the transistor enters its linear region of operation. When the current demand exceeds the cell's ability to maintain a predetermined minimum terminal voltage, the transistor enters the linear operating region thereby pinching off the cell current to the extent needed to maintain a minimum cell voltage (i.e., the threshold voltage). While in this state, the transistor's drain-to-source resistance increases with increasing current into the circuit to maintain the cell's voltage at an acceptable level. As such, the transistor functions as a cell voltage dependent current limiter. Any other device or circuit that can perform this function is acceptable.

At this point where the transistor is operating in its linear operation region and operating as a current limiter, the bypass diode 56 turns on and begins conducting in parallel with the MOSFET 54 and cell 52. As such, total current $I_T$ into the circuit divides through the circuit into two portions $I_A$ and $I_B$. The $I_A$ current portion flows through the MOSFET 54 and cell 52 and the $I_B$ portion flows through the diode 56. The drain-to-source resistance of the MOSFET 54 adjusts itself automatically to maintain a relatively constant $I_A$ current level through the cell and a current level that guarantees an acceptable cell voltage (the minimum target voltage for the cell). If $I_T$ exceeds the current level desired for $I_A$, the excess current ($I_B$) is caused to flow through the diode 56. The diode thus functions as a bypass element to permit a bypass route for excess current to flow so that the cell voltage can remain at an acceptable level. As a result, the cell is allowed to supply as much power to the load as is possible without exceeding its safe operating condition for its current state-of-charge.

Figure 2:
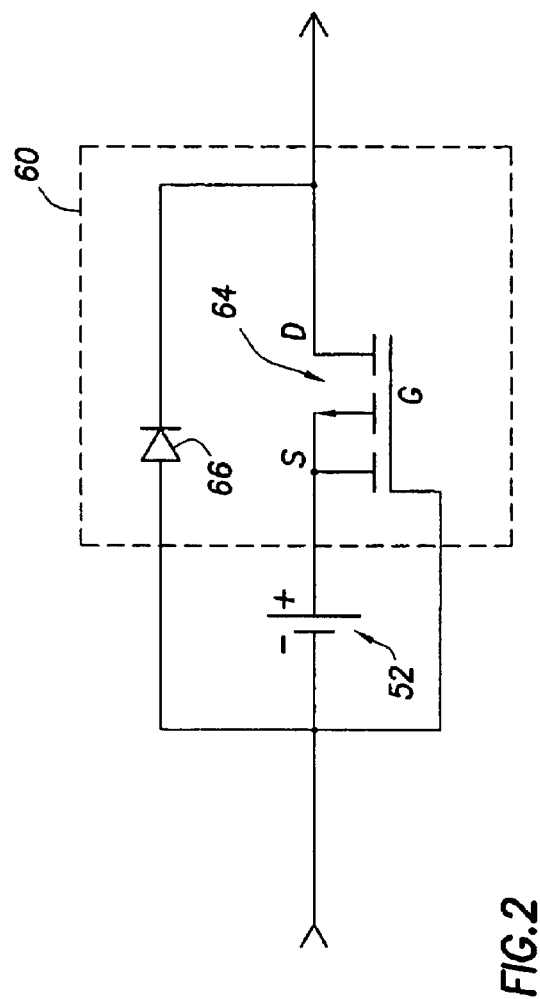
FIG. 2 shows a first alternative embodiment of the protection circuit using a P-channel MOSFET transistor.

An alternative embodiment of the protection circuit is shown in FIG. 2. The protection circuit 60 in FIG. 2 is similar in function to the circuit 50 in FIG. 1. The main difference is that, whereas an n-channel enhancement mode MOSFET was employed as the cell voltage dependent current limiter in circuit 50, a p-channel enhancement mode MOSFET 64 is used in circuit 60. As shown in FIG. 2, the drain of the MOSFET 64 couples to the cathode of bypass diode 66 (which functions similar to bypass diode 56 in FIG. 1). The source of the MOSFET 64 connects to the positive terminal of the cell 52 being protected, while the MOSFET's gate couples to the cell's negative terminal and the diode's anode as shown. Conceptually, the protection circuit 60 functions much the same way as the protection circuit 50 of FIG. 1. As such, a description of operation of circuit 60 is unnecessary and not specifically included herein.

In some downhole tool and other applications, it is desirable to be able to extract a short duration "burst" of energy from a battery. In downhole nuclear magnetic resonance (NMR) applications, such bursts might be on the order of 900 mA for less than one second with a 2–5 second recovery period between pulses. Such high current bursts would cause the protection circuits 50 and 60 for each cell to be activated to reduce the current through each cell. If this were to occur, the performance of the battery during the high current bursts would suffer because of the presence of the protection circuits. However, the high current bursts are of short enough duration so as generally not to harm the cells. Thus, the protection circuits can be modified to permit the protected cells to provide the desired high current bursts.

Figure 3:
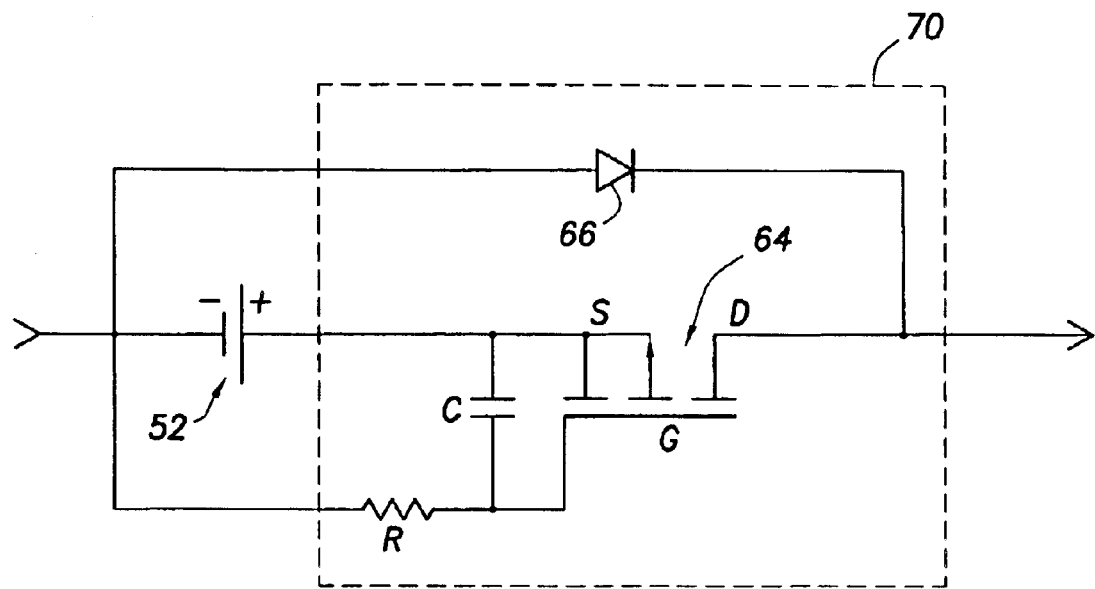
FIG. 3 shows a second alternative embodiment of the protection circuit.

The modification to the protection circuit is to add one or more components that introduces a time delay to the protection capability during pulsed load conditions. An example of a protection circuit that provides a suitable time delay is shown in FIG. 3. The protection circuit 70 of FIG. 3 is largely the same as that of FIG. 2. The difference, however, is that a resistor (R) and a capacitor (C) have been added to the circuit. The resistor R couples between the negative terminal of the cell 52 and the gate of the MOSFET 64. The capacitor C couples between the positive terminal of the cell and the gate of the MOSFET. The interaction between the resistor and capacitor introduces a time delay with a time constant that is a function of the values of the resistance of the resistor and the capacitance of the capacitor, as readily understood by those skilled in the art. As such, the protection afforded by the circuit 70 is delayed from being triggered by any desired amount of time as dictated by the resistor-capacitor combination selected. Thus, the cell is able to deliver additional current under short duration pulsed conditions without permanent cell degradation. This is particularly beneficial because the protection circuitry results in an increased loss of power when activated. As a result, the endurance of the battery is improved as acceptable current pulses may be delivered to the load without activating the protection circuitry.

Figure 4:
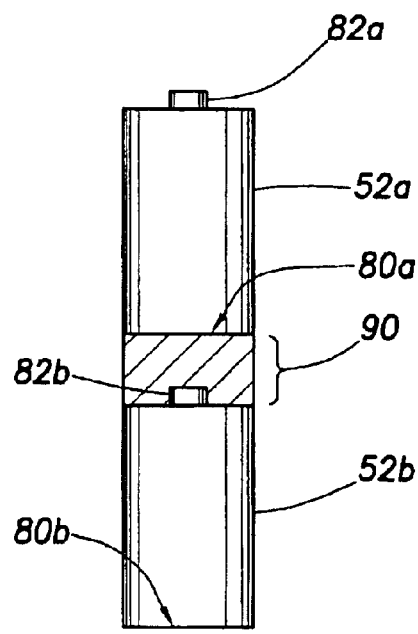
FIG. 4 shows a mechanical layout illustrating the physical location of the protection circuit in relation to two adjacent cells.

FIG. 4 illustrates one out of numerous possible way to package the protection circuit of the various preferred embodiments described above with cells in a battery. Two cells 52a and 52b are shown in series. Respectively, each cell has a positive terminal 82a, 82b and a negative terminal 80a, 80b. The positive terminal 82b of cell 52b generally couples to the negative terminal 80a of cell 50a. The protection circuit can be fabricated in the form of a disk or wafer 90 that is inserted between the cells. Wafer 90 as shown is used to protect cell 52b. Electrical connections can be made between the wafer 90 and the cell 52b in accordance with the schematics of FIGS. 1–3.

The preferred embodiments of the cell protection circuit described above offer a variety of advantages over conventional protection schemes. For example, failure of any one component in the protective circuit itself may result in a degradation of the protective circuit's performance, but such a failure generally is benign in nature. For example, the drain-to-source short circuit of a power MOSFET is the most likely failure mode for this circuit. The short circuit of the MOSFET transistor will result in a loss of its local protection circuit, however, protection would still be provided by the current limit set by the strongest cell in a string of serially connected battery cells.

Further, an open circuit MOSFET failure removes the corresponding cell from the battery circuit. Nevertheless, the battery itself would continue to operate with its voltage reduced by one cell potential, and the current generated by the remaining series cells would be conducted through the bypass diode of the disconnected cell.

An open circuit bypass diode failure removes the possibility of conducting battery current around a weak cell, but does not prevent operation of the cell's protection circuit. This condition results in the maximum current of the series string of cells being limited to that of the affected cell.

A short circuit bypass diode failure results in the discharge of the affected cell until depleted. The protection circuit limits the discharge rate to a safe value, and tapers the current level to zero before an unsafe depth-of-discharge condition is reached. As a result, the series string of cells is reduced by the affected cell voltage, however, normal operation of the remaining battery cells continue to provide power. As before, cell venting and catastrophic failure of the battery is unlikely.

The protection circuit of the preferred embodiment as described above also provides a number of other advantages as well. The protection circuit provides any one or more or all of the following advantages:

1. Prevents cell damage during depassivation discharge.
2. Prevents over depletion of battery charge for hazardous chemistry cells. The battery may be fully discharged in operation without over-discharge cell venting. This in turn, reduces the risk of chemical accidents.
3. Improves safety and restrictions during shipping and handling of assembled batteries.
4. Allows hard connection of batteries to a load without an inrush or cell reversal hazard.
5. Prevents cathode freeze-over due to excessive discharge currents.
6. May be configured to support pulse discharge loading while maintaining overload protection for each cell.
7. Allows any number of cells to be placed in series without loss of performance, or inducing a single point failure hazard.
8. Eliminates the need to add parallel strings to protect for loss of power resulting from the failure of a single cell.
9. Prevents loss of cell capacity due to excessive voltage depression during high discharge loading.
10. Greatly reduces the risk of cell venting during operation.
11. Distributes current limiter or power loss (heat) over the full battery volume. Lowered junction temperature results in better overall reliability.
12. Allows each cell to source current to its peak ability before limiting action is activated.
13. Low cost solution results from large production volume of circuit requiring only a few components.
13. Protection modules may be reused when depleted batteries are replaced.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A cell protection circuit, comprising:
   a transistor coupled to said cell; and
   a current bypass device coupled to said transistor and said cell;
   wherein said transistor limits the current that can flow through said cell when the voltage across said cell falls to a predetermined minimum level; and
   wherein the current bypass device permits at least a portion of the current to bypass the cell.

2. The cell protection circuit of claim 1 wherein said current bypass device conducts current when said transistor limits the current through the cell.

3. The cell protection circuit of claim 1 wherein said transistor is connected in series with said cell and said current bypass device is connected in parallel to said serially connected transistor and cell.

4. The cell protection circuit of claim 1 wherein said current bypass device comprises a diode.

5. The cell protection circuit of claim 1 wherein said transistor comprises a MOSFET.

6. The cell protection circuit of claim 1 wherein said transistor comprises an n-channel enhancement mode MOSFET.

7. The cell protection circuit of claim 6 wherein the n-channel enhancement mode MOSFET has a threshold voltage substantially the same as the predetermined minimum level.

8. The cell protection circuit of claim 7 wherein said current bypass device comprises a diode.

9. The cell protection circuit of claim 8 wherein said n-channel enhancement mode MOSFET has gate, source and drain terminals and said source terminal couples to the negative terminal of said cell, said drain terminal couples to the anode of said diode, and the cathode of said diode and said gate terminal couple to the positive terminal of said cell.

10. The cell protection circuit of claim 1 wherein said transistor comprises an p-channel enhancement mode MOSFET.

11. The cell protection circuit of claim 10 wherein the p-channel enhancement mode MOSFET has a threshold voltage substantially the same as the predetermined minimum level.

12. The cell protection circuit of claim 11 wherein said current bypass device comprises a diode.

13. The cell protection circuit of claim 12 wherein said p-channel enhancement mode MOSFET has gate, source and drain terminals and said source terminal couples to the positive terminal of said cell, said drain terminal couples to the cathode of said diode, and the anode of said diode and said gate terminal couple to the negative terminal of said cell.

14. The cell protection circuit of claim 1 further including a delay device coupled to said cell and said transistor, said delay device slows the rate of change of voltage across said cell with changes in current load on said cell.

15. The cell protection circuit of claim 14 wherein said delay device comprises a resistor coupled to a capacitor.

16. A protection circuit for a cell, comprising:
 a means for limiting current through said cell when the voltage across said cell reaches a predetermined threshold; and
 a means for bypassing current around said cell when the voltage across said cell reaches the predetermined threshold.

17. The protection circuit of claim 16 further including a means for providing a time delay.

18. A method of protecting a cell, comprising:
 limiting the current through said cell when the voltage across said cell falls to a minimum predetermined level; and
 when limiting the current, permitting current to conduct through a bypass device coupled in parallel with said cell.

19. The method of claim 18 wherein limiting the current through said cell is performed using a transistor.

20. The method of claim 19 protecting a cell further including providing a time delay to the voltage across said transistor.

21. A battery, comprising:
 a plurality of cells connected in series; and
 a separate protection unit coupled to each cell, each protection unit protecting its associated cell and comprising:
 a transistor coupled to said associated cell; and
 a diode coupled in parallel with said transistor and said associated cell to cause current to be automatically diverted from said cell when a voltage meeting or exceeding a threshold voltage of the diode is applied to said diode;
   wherein said transistor limits the current that can flow through said associated cell when the voltage across said associated cell falls to a predetermined minimum level.

22. The battery of claim 21 wherein said diode conducts current when said transistor limits the current through the cell.

23. The battery of claim 21 wherein said transistor is connected in series with said cell and said diode is connected in parallel to said serially connected transistor and cell.

24. The battery of claim 21 wherein said transistor comprises a MOSFET.

25. The battery of claim 21 wherein said transistor comprises an n-channel enhancement mode MOSFET.

26. The battery of claim 25 wherein the n-channel enhancement mode MOSFET has a threshold voltage substantially the same as the predetermined minimum level.

27. The battery of claim 26 wherein said n-channel enhancement mode MOSFET has gate, source and drain terminals and said source terminal couples to the negative terminal of said cell, said drain terminal couples to the anode of said diode, and the cathode of said diode and said gate terminal couple to the positive terminal of said cell.

28. The battery of claim 21 wherein said transistor comprises an p-channel enhancement mode MOSFET.

29. The battery of claim 28 wherein the p-channel enhancement mode MOSFET has a threshold voltage substantially the same as the predetermined minimum level.

30. The battery of claim 29 wherein said p-channel enhancement mode MOSFET has gate, source and drain terminals and said source terminal couples to the positive terminal of said cell, said drain terminal couples to the cathode of said diode, and the anode of said diode and said gate terminal couple to the negative terminal of said cell.

31. The battery of claim 21 further including a delay device coupled to said cell and said transistor, said delay device slows the rate of change of voltage across said cell with changes in current load on said cell.

32. The battery of claim 31 wherein said delay device comprises resistor coupled to a capacitor.

33. A battery cell protection circuit, comprising:
 a current limiter capable of being coupled to a battery cell; and
 a bypass device coupled in parallel with the current limiter and cell, said bypass device adapted to direct current flow around said cell;
 wherein the current limiter functions to limit current to the cell when the cell voltage reaches a predetermined threshold.

34. The circuit of claim 33 wherein the current limiter comprises a transistor.

35. The circuit of claim 33 wherein the current limiter comprises an n-channel MOSFET.

36. The circuit of claim 33 wherein the current limiter comprises a p-channel MOSFET.

37. The circuit of claim 33 wherein said bypass device comprises diode.

38. The circuit of claim 33 further including a delay element coupled to said current limiter to delay the current limiting action of said current limiter when the cell voltage reaches the predetermined threshold.

* * * * *

UNITED STATES PATENT AND TRADEMARK OFFICE
CERTIFICATE OF CORRECTION

PATENT NO. : 6,815,930 B2
DATED : November 9, 2004
INVENTOR(S) : George D. Goodman It is certified that error appears in the above-identified patent and that said Letters Patent is hereby corrected as shown below:

<u>Title page,</u>
Item [73], Assignee, should read:
-- Halliburton Energy Services, Inc. --.

Signed and Sealed this

First Day of March, 2005

JON W. DUDAS
*Director of the United States Patent and Trademark Office*